US007997775B2

(12) United States Patent
Hurwitz (10) Patent No.: US 7,997,775 B2
(45) Date of Patent: Aug. 16, 2011

(54) HIGH VISIBILITY SAFETY LIGHTING SYSTEM INTEGRATED WITHIN A VEHICLE'S FRAME

(75) Inventor: Marni Markell Hurwitz, Far Hills, NJ (US)

(73) Assignee: Nite Glow Industries, Inc., Far Hills, NJ (US)

( * ) Notice: Subject to any disclaimer, the term of this patent is extended or adjusted under 35 U.S.C. 154(b) by 414 days.

(21) Appl. No.: 12/284,569

(22) Filed: Sep. 23, 2008

(65) Prior Publication Data
US 2009/0080207 A1    Mar. 26, 2009

Related U.S. Application Data

(60) Provisional application No. 60/995,102, filed on Sep. 24, 2007.

(51) Int. Cl.
*B62J 6/00* (2006.01)
*F21V 33/00* (2006.01)

(52) U.S. Cl. .......... 362/474; 362/554; 362/464; 362/84; 362/541; 362/545

(58) Field of Classification Search .................. 362/102, 362/473–474, 464, 486, 540, 541, 544, 545, 362/234, 253, 84, 551, 554, 555; 135/910
See application file for complete search history.

(56) References Cited

U.S. PATENT DOCUMENTS

| 2,642,519 | A | * | 6/1953 | Caustin et al. | 362/577 |
| 4,901,209 | A | * | 2/1990 | Nitz | 362/473 |
| 5,008,782 | A | * | 4/1991 | Murray | 362/474 |
| 5,245,517 | A | | 9/1993 | Fenton | 362/156 |
| 5,566,384 | A | | 10/1996 | Chien | 362/486 |
| 5,743,621 | A | | 4/1998 | Mantha et al. | 362/105 |
| 6,175,196 | B1 | * | 1/2001 | Ragner et al. | 315/200 A |
| 6,204,752 | B1 | | 3/2001 | Kishimoto | 340/432 |
| 6,558,018 | B1 | | 5/2003 | Blum | 362/183 |
| 6,772,711 | B2 | | 8/2004 | Morgan | 119/795 |
| 6,945,663 | B2 | * | 9/2005 | Chien | 362/84 |
| 7,119,668 | B2 | | 10/2006 | Kitamura et al. | 340/432 |
| 2005/0057942 | A1 | | 3/2005 | Makeo et al. | 362/554 |
| 2005/0057943 | A1 | | 3/2005 | Makeo et al. | 362/555 |
| 2006/0125615 | A1 | | 6/2006 | Song | 340/463 |
| 2009/0056777 | A1 | * | 3/2009 | Lawhead | 135/66 |

FOREIGN PATENT DOCUMENTS

JP         02053649 A  *  2/1990
* cited by examiner

*Primary Examiner* — Thomas M Sember
(74) *Attorney, Agent, or Firm* — Ernest D. Buff; Ernest D. Buffet & Associates, LLC; Harry Anagnastopolos (57) ABSTRACT

A self-contained battery powered high visibility safety lighting system is integrated within portions of a vehicle or article's frame, such as a handlebar or body assembly of a motorcycle, bicycle, scooter or toy cycle, stroller, wheel chair, baby carriage, cane or ski pole. The system comprises at least one illumination segment having at least one light source located therein. The light source may comprise a plurality of light emitting diodes integrated within a plurality of apertures located within each of the illumination segments. In another embodiment the illumination segments may be composed of a transparent material to yield transparent illumination segments with an inlay cavity therein for accommodating an electroluminescent light strip. Light may further be emitted from illuminated streamers located on the handlebar grips. Multifaceted emission of light from illumination segments integrated within the frame of the vehicle is highly visible from virtually all directions. An omnidirectional light-alert increases safety for drivers and others in the vehicle's vicinity.

24 Claims, 5 Drawing Sheets

HIGH VISIBILITY SAFETY LIGHTING SYSTEM INTEGRATED WITHIN A VEHICLE'S FRAME

This application claims the benefit of U.S. Provisional Application No. 60/995,102, filed Sep. 24, 2007.

BACKGROUND OF THE INVENTION

1. Field of the Invention

The present invention relates to a high visibility safety lighting system integrated within a vehicle such as a bicycle, motorcycle or a stroller; more particularly to a safety lighting system integrated within segments of a frame of a vehicle that provides illumination to the frame for enhanced safety while operating the vehicle during dusk or nighttime hours.

2. Description of the Prior Art

Many patents address issues related to providing safety lights for bicycles, motorcycles or strollers. However, several of the lighting devices heretofore disclosed and utilized fail to provide a lighting system that is integral within a frame of a vehicle, such as a bicycle or stroller. Moreover, the lighting devices heretofore disclosed and utilized fail to provide a significant quantum of light emitted from a frame of a vehicle in a manner so the operator is highly visible to others.

Assorted lightning devices are provided as attachments appointed to be affixed to the external body of the vehicle/bicycle/stroller, and are not integrated within the frame of the vehicle. For example: U.S. Pat. No. 5,245,517 to Fenton discloses a lighted bicycle carrier bag comprising a bag body defining an enclosed space and suitable elements for attaching the body to a portion of a bicycle and having an electroluminescent light strip on the exterior of the bag such that it is visible to an observer from both sides and either the rear or the front thereof; U.S. Pat. No. 5,566,384 to Chien discloses a vehicle with an EL light strip via a moving vehicle illuminated sign incorporating a D.C. power supply, sensor, electric circuit, function control circuit, electroluminescent light strip, switch and housing, that is stuck on the vehicles' body by glue to give other vehicles' a message for special situations or a warning signal for unexpected situations on road; U.S. Pat. No. 6,558,018 to Blum discloses a vehicle light apparatus removably mounted on a vehicle such as a stroller or bicycle including a rectangular web of pliant material having opposed long sides with fasteners for wrapping around an elongate member of a vehicle and light emitters positioned to emit light from opposed sides of the member; U.S. Pat. No. 6,772,711 to Morgan discloses a reversible reflective/fluorescent rectangular sleeve safety device having two strips of highly reflective material on one side with one half of a hook and loop fastening means and two strips of high-visibility fluorescent material on the opposite side with the remaining half of the hook and loop fastening device; the sleeve does not have active illumination and does not work reliably in either daytime or nighttime hours; and US Patent Publications 20050057943 and 20050057942 to Mako et al. disclose illumination and reflective devices comprising an illumination device with a top side having a reflective surface and a plurality of holes, an electrical circuit connected to a single light emitting diode (LED) light source operating with a plurality of fiber optic cables secured thereto to emit light through the holes, and an attaching surface, such as a magnetic or Velcro® layer, for securing the illumination device to articles, such as clothes, automobiles, poles, etc. These lighting/reflective devices are appointed to be attached to the exterior body of a vehicle, via fastening means, and are not integrated within the frame of the vehicle. As such, these devices must be applied by the operator onto the body of the vehicle, and the visibility is limited. Moreover, as these devices are on the exterior of the vehicle, they are vulnerable to damage during usage of the vehicle, or during inclement weather.

Other lighting devices are provided to indicate information to an operator of a vehicle as display lights, and are not visible as safety lights warning others of the vehicle's presence. For example: U.S. Pat. No. 6,204,752 to Kishimoto discloses a bicycle display unit with backlight that displays information to the rider on a display panel, such as bicycle speed, distance traveled, lap time, running time, current time, rider cadence, torque applied to the bottom bracket axle, and shift position of the shifting mechanism. The bicycle display unit has a backlight arranged to illuminate the front display surface for viewing the information displayed thereon; and U.S. Pat. No. 7,119,668 to Kitamura et al. discloses illumination-controlled bicycle display apparatus comprising a display device mounted to the bicycle, wherein the display device displays various types of information to a rider. A light sensor and a display control element are coupled to the display device, which displays information in a backlit LCD screen in accordance with signals from the light sensor. These devices are merely display devices for the operator to view operating information. Illumination of the backlight does not constitute a safety light informing others of the presence of the bicycle in the road. Several of these lights are display lights, not safety lights.

Various lighting devices are provided for implementation into devices appointed to be worn or operate in conjunction with a vehicle, such as safety helmets. For example: U.S. Pat. No. 5,743,621 to Mantha et al. discloses an illuminated safety helmet having a pair of LED modules that are mounted at the front thereof associated with an electrical circuit having an on-board battery activated via a chin strap fitted with snap and electrical contacts incorporated within connectors which when joined operate to secure the helmet on the user's head and close and opens the circuit to activate the lights. These type of devices are not integrated within the frame of a vehicle, but are rather utilized in helmets or the like. As such, using these helmet lights provides a degree of safety, but lighting emitted from the frame of the vehicle would provide enhanced visibility of the operator even from further distances off.

Other lighting devices are constructed and utilized as indicator lights for vehicles, and do not operate or function to provide safety lighting for the vehicle. For example: US Patent publication 20060125615 to Song discloses vehicle accelerator and brake indicators providing visual indication of braking, coasting and acceleration that are visible from the front, sides and rear of a vehicle, such as cars, trucks, trailers, airplanes, motorcycles, bicycles, and toy vehicles, comprising a housing including a reflective shell and one or more translucent lenses forming a sealed enclosure, a connector or socket, a removable light bulb or light emitting element, a means to electrically connect a socket to the brake light electrical system, and a means to electrically connect a socket to a sensor attached to the accelerator system of a motor vehicle. These types of indicator lighting devices are merely vehicle accelerator and brake indicators and are not suited for bicycles or strollers as same generally do not contain acceleration sensors. Moreover, light is merely emitted when the vehicle is braking, coasting and acceleration, and as such they are not visible at all times during operation at night; as a result, these types of indicator lights, although useful to warn other drivers of the operators actions, are not optimal in providing visibility lighting safety.

There remains a need in the art for a high visibility safety lighting system integrated within the frame or body of a vehicle, such as a motor cycle, bicycle, scooter, or toy vehicle, as well as a stroller, baby carriage walker, wheel chair, cane, ski pole, or the like, that visually warns drivers of proximate vehicles and traffic, thereby increasing the margin of safety for occupants and others in the immediate vicinity of the lighting system.

SUMMARY OF THE INVENTION

The present invention is directed to a high visibility safety lighting system integrated within the external frame of a vehicle. This high visibility safety lighting system is especially suited for use by motorcycle, bicycle, scooter, and toy vehicles used by children ("vehicle") and strollers. It may additionally find use with moving articles, such as walkers, wheel chairs, baby carriages, canes, ski poles and the like.

The system comprises at least one illumination segment incorporated within the frame of the vehicle (or article, as the case may be). For convenience, the invention will be discussed hereinafter principally in connection with systems integrated within the frame of a vehicle. However, it will be understood that the principles of the invention are equally applicable to articles of the type mentioned heretofore. Typically, the frame comprises a handlebar assembly and a body assembly. At least one light source is provided and located within the illumination segment. A power supply means activated by a power control is further provided for supplying current to the light source and activating same to emit light. The light source emits light from the illumination segment of the frame of the vehicle so that the frame of the vehicle is highly visible alerting all proximate drivers and traffic to the presence of the vehicle and increasing safety accorded to an operator of the vehicle.

Optionally, the high visibility safety lighting system is constructed so that at least one of the illumination segments is integrated within the handlebar assembly of the frame, as with a bicycle, motorcycle, or the like. The body assembly of the frame of the vehicle typically comprises a rear shaft assembly, support body, seat shaft, and front wheel shaft. In one embodiment, there is at least one of illumination segment integrated within the rear shaft assembly, support body, seat shaft, and/or front wheel shaft assembly of the body assembly of the frame.

The light source may comprise a plurality of light emitting diodes integrated within a plurality of apertures located within each of the illumination segments of the frame to form a diode illumination segment. The handlebar assembly and/body assembly of the vehicle may include at least one of the diode illumination segments. In another embodiment the illumination segments may be composed of a transparent material to yield transparent illumination segments with an inlay cavity therein for accommodating the light source, which is then provided as an electroluminescent strip/ribbon. Both types of light sources and illumination segments may be utilized in conjunction with one another to provide for omnidirectional light transmission. Alternatively, the body assembly and the handlebar assembly of the frame are substantially composed of a transparent material constructed with an inlay channel appointed for housing the light source, wherein the light source comprises an electroluminescent light strip so that a substantial portion of the frame emits light, thereby forming an omnidirectionally lighted outline of the frame in dimly lit surroundings.

In another embodiment, the high visibility safety lighting system comprises illuminated streamers extending from a pair of handlebar grips of said handlebar assembly. The streamers may include an electroluminescent wire integral therewith so that light is emitted form the streamers. Alternatively, the streamers include a plurality of fiber optic cables and a light source associated therewith, so that the streamers emit light through the fiber optic cables.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

The present invention provides a high visibility safety lighting system that is integrated within the frame of a vehicle, such as a bicycle, stroller, motorcycle, or the like, that emits light along a substantial portion of the surface of the frame, including the handlebar assembly and/the body assembly of the frame. The system comprises at least one illumination segment incorporated within the frame of the vehicle, including a handlebar assembly and a body assembly. At least one light source is provided and located within the illumination segment. A power supply means activated by a power control is further provided for supplying current to the light source and activating same to emit light. The light source emits light from the illumination segment of the frame of the vehicle so that the frame of the vehicle is highly visible alerting all proximate drivers and traffic to the presence of the vehicle and increasing safety accorded to an operator of the vehicle. The illumination segments of the frame emit light therefrom, so that light is emitted from virtually the entire surface, top, bottom, and sides, of the area of the frame wherein the illumination segments are placed so that the vehicle/bicycle/stroller can be seen from any vantage point. This omnidirectional light transmission by one or more of the vehicle's frame elements increases the margin of safety in dusk or night time environments when another vehicle is approaching by illuminating the vehicle's frame from substantially all angles in relation to the illumination segments.

Figure 1A:
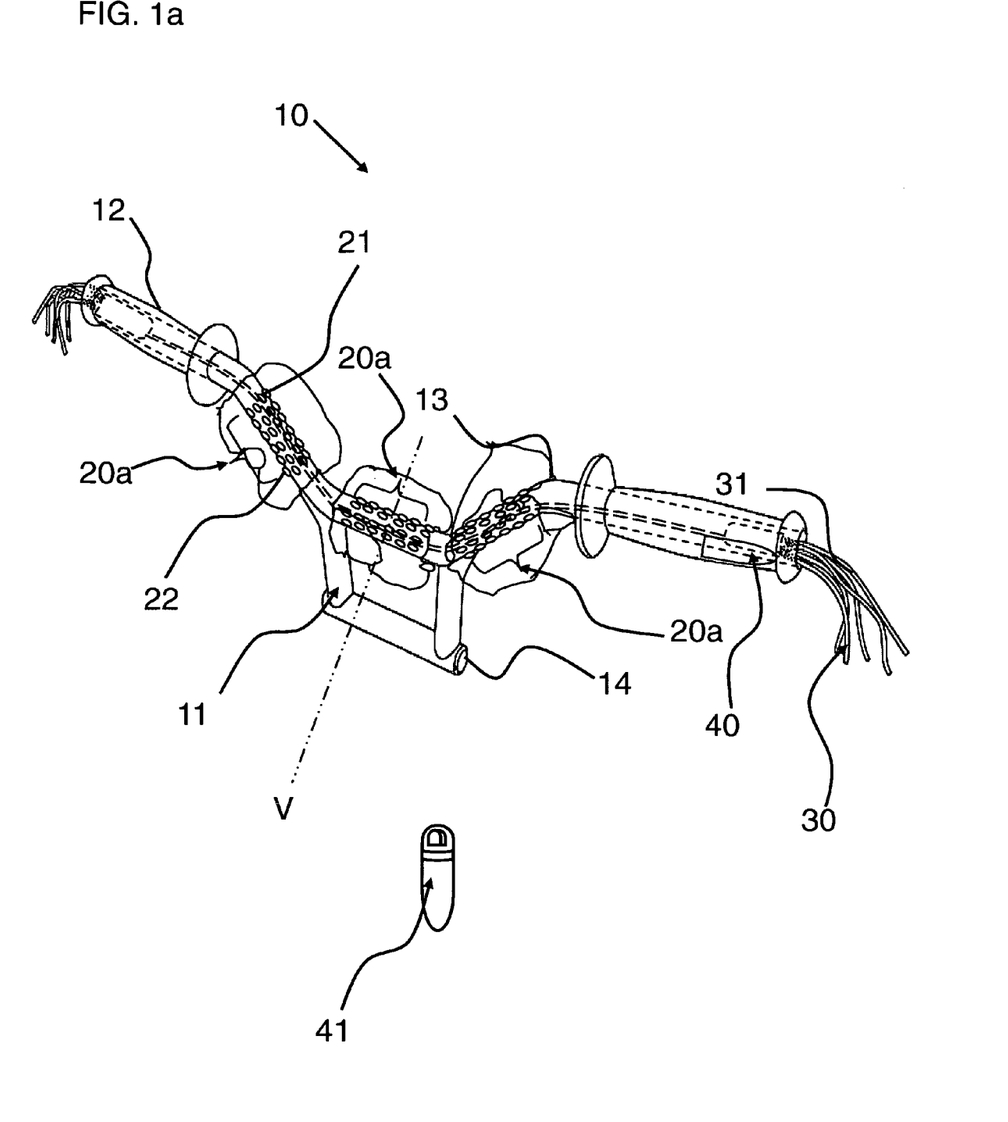
FIG. 1a is a partial view of an embodiment of the high visibility safety lighting system, wherein diode illumination segments are integrated within a handlebar assembly of a bicycle.

FIG. 1a is a partial view of an embodiment of the high visibility safety lighting system, wherein diode illumination segments are integrated within a handlebar assembly of a bicycle, shown generally at 10. The high visibility safety lighting system is shown integrated within a handlebar assembly 11 of an external frame of a vehicle. Handlebar assembly 11 includes hand grip portions 12, a u-bar attachment 13, and a base attachment 14 appointed for attaching handlebar assembly 11 to a bicycle. At least one illumination segment 20 (20a-20n) is incorporated within handlebar assembly 11. Preferably, there is a plurality of illumination segments 20a-20n provided; herein three such segments 20a located in u-bar attachment 13. At least one light source is located within said illumination segment 20a-20n powered by a power source (battery) controlled by a power control for supplying current to the light source and activating same to emit light from illumination segments 20a-20n. Illuminating segments 20a herein are provided as diode illuminating segments, wherein a plurality of apertures 21 are located within each of the segments 20a having light emitting diodes 22 integrated therein. Light emitting diodes of diode illumination segments 20a may be sequenced intermittently to generate moving, blinking, flashing or cascading light. The high visibility safety lighting system may be integrated into the frame of a plethora of vehicles, including a motorcycle, scooter, or other motor driven cycle-like device, stroller, walker, or child's toy, ski poles, etc., or a bicycle for an adult or child. At least one of illumination segment 20a-20n is preferably integrated within handlebar assembly 11 of the frame. In addition, the body assembly of the frame preferably includes at least one illumination segment 20n integrated therein.

Preferably, the high visibility safety lighting system further comprises streamers 30 extending from pair of handlebar grips 12 of handlebar assembly 11. Streamers 30 are preferably composed of a polymeric material and include an electroluminescent wire 31 integral therewith so that light is further emitted form streamers 30. Streamers 30 are preferably composed of a transparent material so that electroluminescent wire 31 emits light from virtually the entire surface of streamers 30. Alternatively, streamers 30 include a plurality of fiber optic cables with a light source (LED) associated therewith so that the fiber optic cables emit light therethrough.

The high visibility safety lighting system preferably includes one or more on-board batteries as the power supply means. The power control attached to the power supply means may be activated a number of different ways, including: (i) a card reader 40 and a key 41 having a card tag that activates the card reader (this embodiment shown herein in FIG. 1a) The use of the card reader 40 is advantageous in that it provides instant activation of the current to the lighting source in illumination segments 20 without concern for water effecting the power control; (ii) a pressure sensor located within an interior/seat of the vehicle for supplying current to the light source; (iii) a light sensor engaged with the power control attached to the power supply means for automatically activating/deactivating the current supply to the light source; (iv) an "on"/"off" power switch; or (v) one or more acceleration detecting means, a delay generating circuit means, and a microprocessor (shown in FIG. 1b).

Figure 1B:
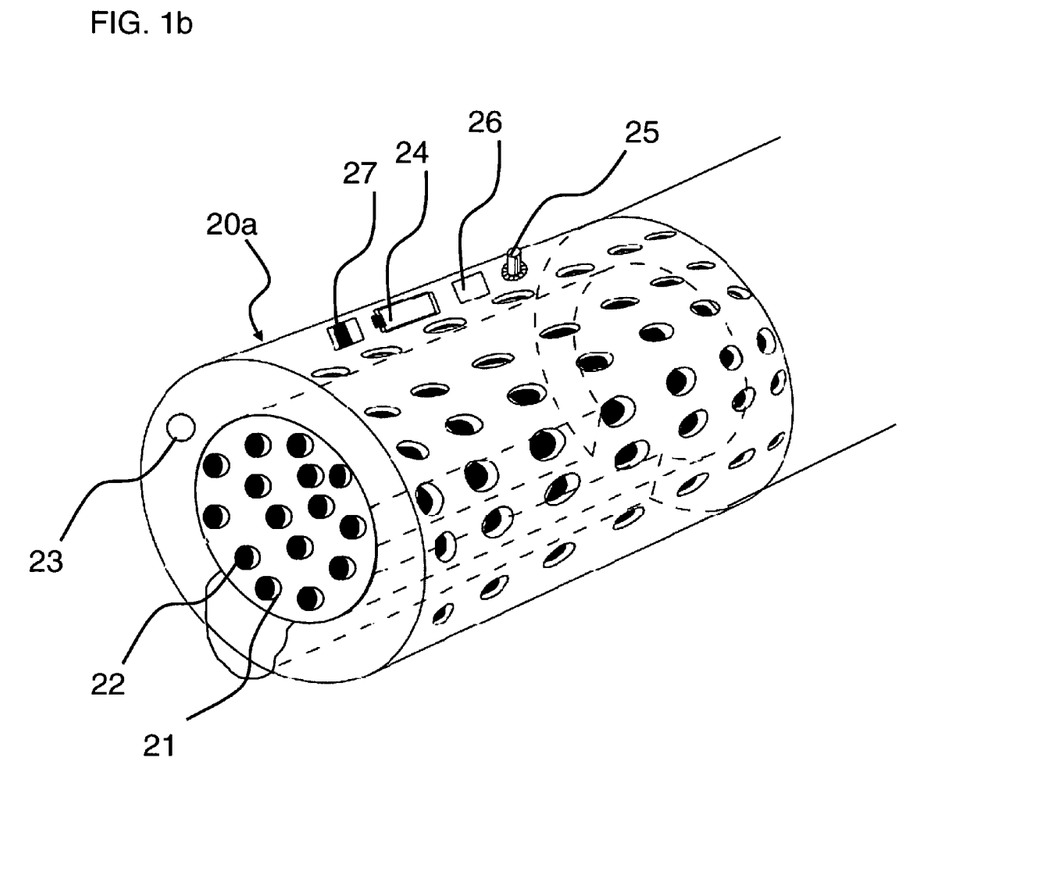
FIG. 1b is a cross-sectional view of the handlebar assembly taken along line V of FIG. 1a, showing a cross-section of a diode illumination segment.

FIG. 1b is a cross-sectional view of the handlebar assembly taken along line V of FIG. 1a, showing a cross-section of a diode illumination segment 20a. Diode illumination segment 20a is preferably cylindrical as shown, but the shape and size is determined based upon the location on the frame of the vehicle. A plurality of apertures 21 are integrated into illumination segment 20a and house light emitting diodes 22 therein. Preferably, light emitting diodes 22 and visa vie apertures 21 traverse substantially the entire circumference of the frame section, as shown, to yield 360 degrees of light emission, especially when utilized on the handlebar assembly. Alternatively, diodes 22 and apertures 21 cover the outer show surface of the segment 20a. Diode illumination segment 20a may include at least one acceleration sensor shown at 23. A battery 24, which is preferably rechargeable, powers the device when the optional on/off switch 25 is turned on. The battery 24 powers the acceleration sensor 23, the microprocessor 26, the delay time generating circuit element 27, which is optionally user adjustable, and a plurality of light emitting diodes 22 that are incorporated on the external surface of the high visibility safety lighting device 20a. The microprocessor 26 receives an acceleration signal from the acceleration sensor 23 when the vehicle or stroller is moved. The microprocessor turns on the light emitting diodes 22 and keeps them turned on for a time period set by the delay time generating circuit element 27. The optional on/off switch at 25 is used to turn off power to the high visibility safety lighting device during long term storage.

Figure 2A:
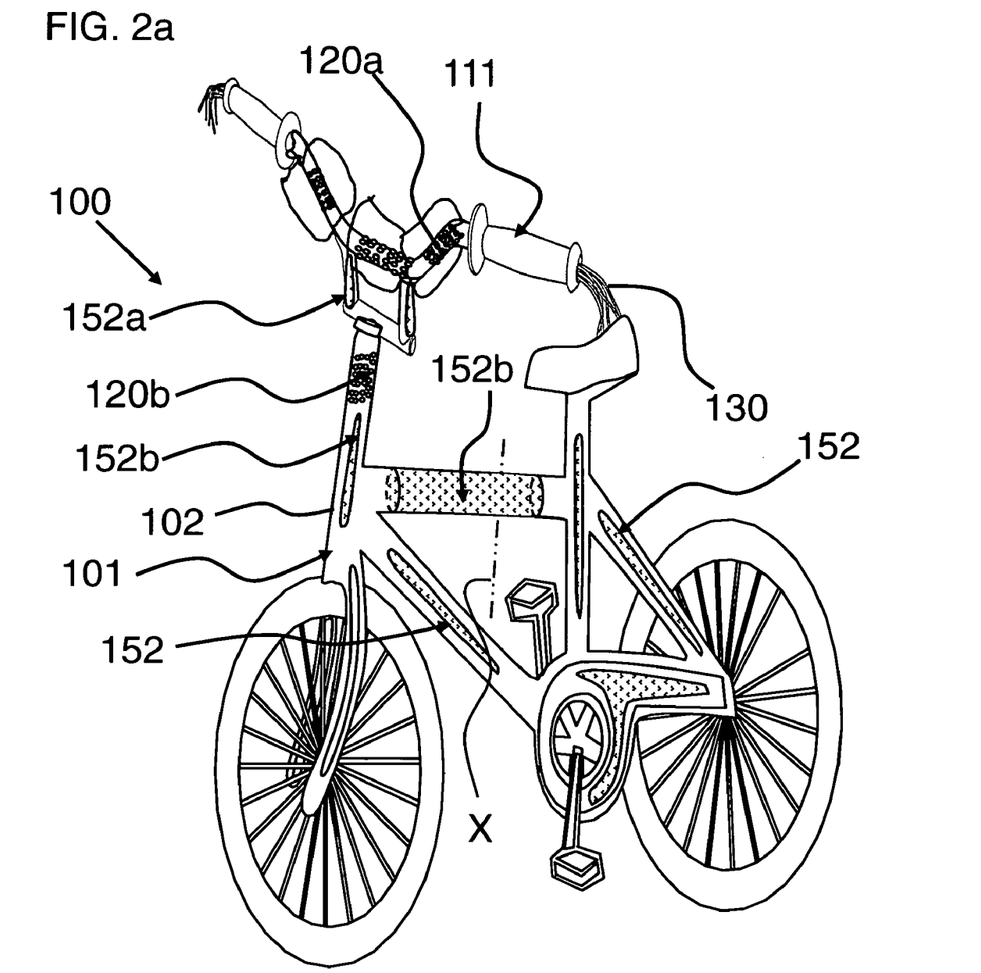
FIG. 2a is a schematic view of a bicycle with a plurality of diode illumination segments and transparent illumination segments integrated within the frame thereof.
Figure 2B:
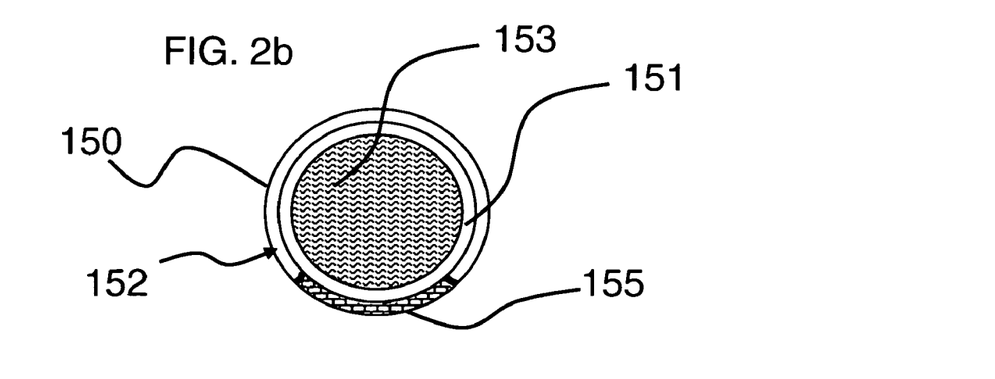
FIG. 2b is a cross-sectional view of the handlebar assembly taken along line X of FIG. 2a, showing a cross-section of a transparent illumination segment.

FIG. 2a is a schematic view of a bicycle with a plurality of diode illumination segments and transparent illumination segments integrated within the frame of the bicycle, shown generally at 100. FIG. 2b is a cross-sectional view of the handlebar assembly taken along line X of FIG. 2a, showing a cross-section of a transparent illumination segment. Bicycle 101 comprises a frame having a handlebar assembly 111 and body assembly 102. Herein handlebar assembly 111 includes illumination segments comprising diode illumination segments 120a, along with illuminated streamers 130. Diode illumination segments 120b are also preferably in body assembly 102 of bike 100. In addition, at least one illumination segment is transparent/or includes a transparent window 150 arranged with an opaque section 155 and comprises an inlay cavity 151 therein to form a transparent illumination segment 152. A plurality (shown herein as two) transparent illumination segments 152a are provided within the handlebar assembly 111; while a plurality of transparent illumination segments 152b are shown in the body assembly of the bike 100 (shown as shaded regions). The light source utilized in transparent illumination segment 152 comprises an electroluminescent wire or strip 153 that is housed within inlay cavity 151 of transparent illumination segment 152a, 152b. A plurality of transparent illumination segments 152b are provided within body assembly 102 of the bicycle's frame, indicated by shaded regions. Transparent illumination segments 152a, 152b-152n may be located anywhere on body assembly 102 or/and on handlebar assembly 111.

In an alternative embodiment, virtually the entire bicycle 100 may be composed of transparent material; that is to say, the body assembly 102 and handlebar assembly 111 of the frame are substantially composed of a transparent material constructed with an inlay channel therein appointed for housing the light source comprising an electroluminescent light strip. The inlay channel and electroluminescent light strip extend within the bicycle's frame so that a substantial portion of the frame emits light, thereby forming a lighted outline of the frame in dimly lit surroundings.

Transparent display/window 150 can be a plethora of shapes and sizes, and may include large regions within illumination segment 120. Transparent displays 150 can be a plethora of shapes, sizes, designs, characters, indicia, and so on. Transparent displays 150 may be specific characters and advertise various organizations. Moreover, opaque sections 155 and transparent displays 150 may be of any size, and may merely be speckles located along the entire surface of illuminated segments 120, which in turn can be on the entire surface of frame 101.

Figure 3:
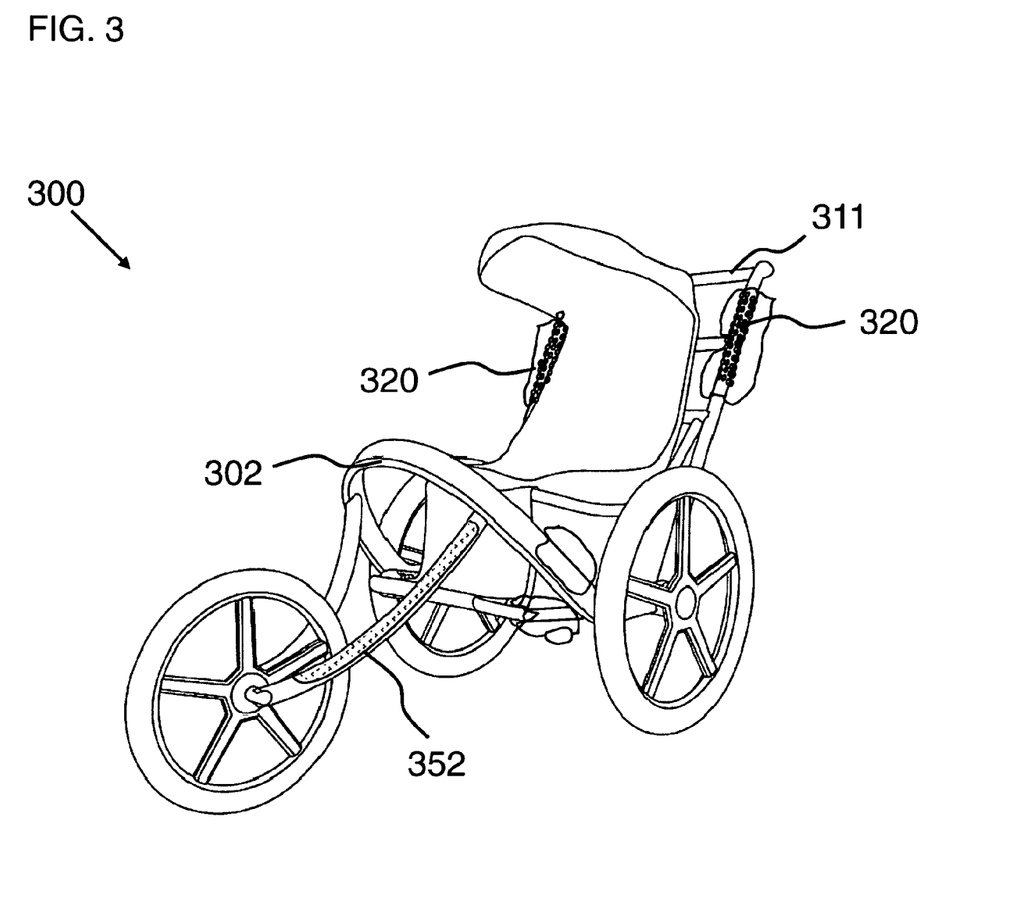
FIG. 3 is a schematic view of a stroller with a plurality of high visibility safety lights via diode illumination segments and transparent illumination segments integrated therein.

FIG. 3 schematically illustrates at 300 a typical integration of the high visibility safety lighting device within the frame of a stroller. Stroller 300 is constructed so that the frame, which includes handlebar assembly 311 and body assembly 302, includes illumination segments 320 comprised of diode illumination segments. Moreover, transparent illumination segments 352 are provided on the body assembly of the stroller 300. In the embodiment wherein an accelerator sensor is utilized (as shown in FIG. 1*b*) the sensor 23 of FIG. 1*b* has a sensitive axis along the direction of travel of the stroller and will provide appropriate acceleration signal. Preferably sensor 23 is a three axis accelerometer, which communicates any observed acceleration to the microprocessor.

Figure 4:
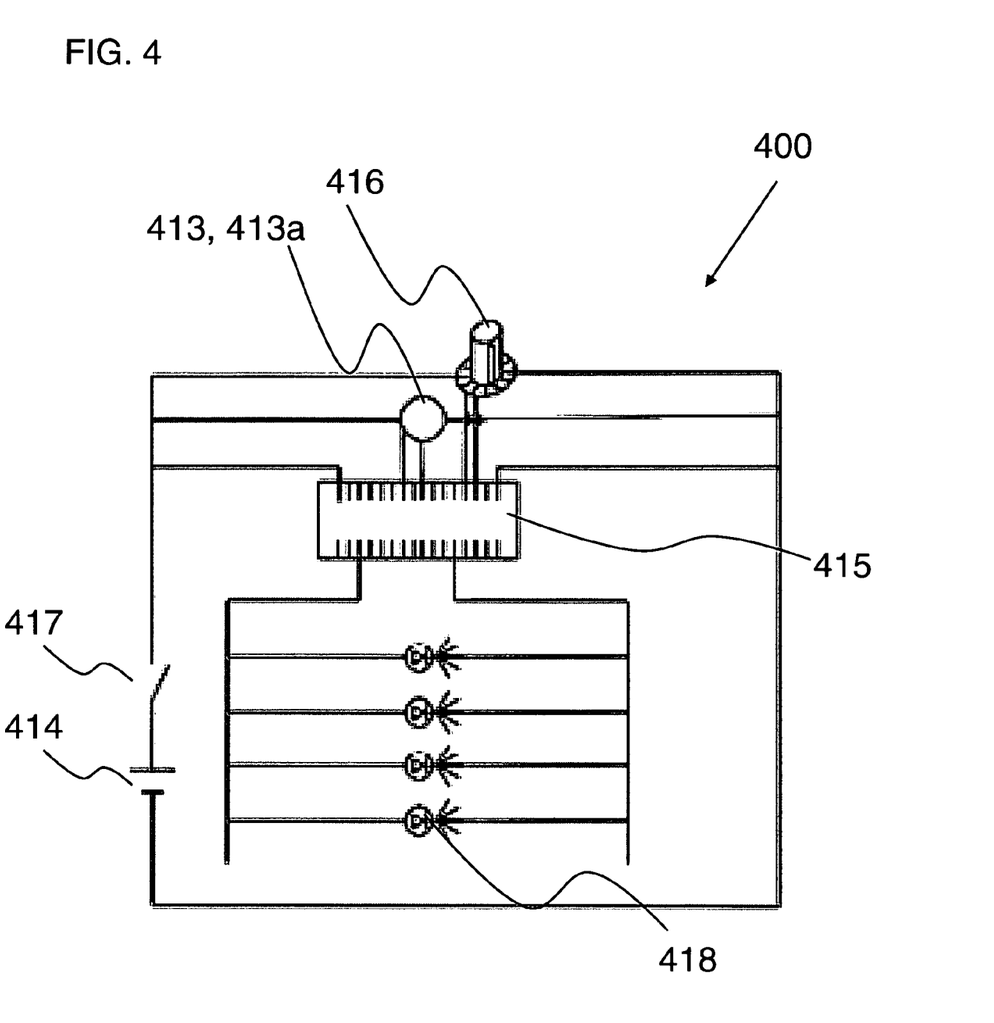
FIG. 4 is a circuit diagram of the high visibility safety lighting device wherein an optional acceleration sensor is utilized.

FIG. 4 illustrates generally at 400 a circuit of the high visibility safety lighting device wherein the acceleration sensor is utilized. Battery 414 powers the high visibility safety lighting device through an on/off switch 417. When switch 417 is in the on position, power is supplied to acceleration sensor 413 and optionally, a second acceleration sensor 413*a*, delay time generating circuit 416 and microprocessor 415. When microprocessor 415 receives an acceleration signal from the acceleration sensor 413, the microprocessor applies battery supplied power to the light source, including the plurality of light emitting diodes 418. The light emitting diodes 418 stay lit by the microprocessor for a pre-selected time period, as set by a signal from delay time generating circuit element 416 to the microprocessor 415.

When a stroller is pushed by a person, the velocity of the movement of the stroller does not remain constant, owing to the stepwise movement of the person pushing the stroller. In such cases, there exist acceleration and retardation components generated when the stroller is moved from a resting position or when the stroller is pushed along a street or a walking path. An accelerometer embedded in the high visibility safety lighting device/frame with its sensing axis oriented along the nominal direction of travel of the stroller detects the motion and communicates this information to a microprocessor. Sensors may be on the frame or on the illumination segment (as shown in FIG. 1*b*). When a three-axis accelerometer is used, any acceleration detected is communicated to the microprocessor. The microprocessor turns on a plurality of light emitting diodes in the external surface of the high visibility safety lighting device and stays lit for the time period set by the delay time generating circuit. During normal use of stroller, additional acceleration change is detected and this, in turn, maintains the light emitting diodes in the "on" condition. Even when the stroller is stopped at a stoplight the light emitting diodes still remain on due to the presence of a delay time generating circuit, enabling proximate vehicles to clearly note the stroller's visibility, thereby enhancing safety for occupants of the stroller and vehicles, alike.

Vehicles such as motorcycles, bicycles, scooters, wheel chairs, and toy cycles used by children also have varying levels of acceleration and deceleration during their operating cycle. The accelerometer sensor picks up these accelerations and turns on the light emitting diodes for each of the acceleration detected. This, in combination with delay time generating circuit essentially illuminates the light emitting diodes during the entire operating period of the vehicle. Even when the motorcycle, bicycle, scooter, wheel chair, or a toy cycle is stopped at a stop light, traffic crossing, or other locations, the light emitting diodes stay "on" for a pre-selected time period, regulated by the delay time generating circuit, thereby providing an increased margin of safety.

Optionally, the delay time generating circuit has a variable resistance or a timing control element that enables the user to set the delay time period. This delay circuit adjustment enables the user to select the time period for which the light emitting diodes will stay on and is particularly suitable when long time interval stoplights are encountered. Since the light emitting diodes are turned off at the end of the delay circuit time period, the battery life is conserved. Optionally, an on-off switch is provided adjacent to the battery connection to turn off the high visibility safety lighting device. This switch is used when the high visibility safety lighting device is removed from the vehicle or stroller and stored for a prolonged time period. Turning off the on-off switch disconnects all the electrical components of the high visibility safety lighting device.

Both analog and digital accelerometers suited for the high visibility safety lighting device are available in a variety of measurement configurations. Analog accelerometers provide an analog output, typically a current in the range of 4 to 20 milliamps or an output voltage of −5V to +5V according to the g-force detected. Digital accelerometers output a pulsed high frequency waveform with a varying square wave pulse width and therefore, the frequency. A capacitive acceleration sensor uses a metal beam or micro-machined feature to produce a capacitance which changes with the acceleration of the device. A piezoelectric acceleration sensor uses a piezoelectric crystal mounted on a mass, and the piezoelectric voltage output is converted to acceleration. A piezo-resistive acceleration sensor has a beam or micro-machined feature whose resistance changes with acceleration. A Hall effect acceleration sensor converts motion to an electrical signal by the sensing of a changing magnetic field. A magnetoresistive acceleration sensor detects changes in material resistivity in the presence of a magnetic field. More recently heat transfer acceleration sensors have been produced which track location of a heated mass during acceleration by sensing temperature. Several of these acceleration sensors react at high frequencies and therefore any mechanical vibration of the sensor is reported as a very high value of g-force. Mechanical spring and ball type accelerometers are also available. The reliability of such accelerometers is poor as compared to other accelerometers due to their bounce characteristics and ball sticking behavior. Accordingly, mechanical spring and ball type accelerometers are not preferred for applications of the safety lighting device. Digital accelerometers are highly reliable and are not damaged when the sensor is subjected to high g-forces. In addition, these sensors detect acceleration in more than one axis.

Analog devices Inc. produces digital output multi-axis accelerometers. These digital devices directly couple to a microprocessor to determine the acceleration or deceleration. For example, iMEMS sensor ADXL202/JQC/AQC measures ±2 g, while sensor ADXL210/JQC/AQC measures ±10 g.

Silicon Devices Inc. produces digital output multi-axis accelerometers based on micro electro mechanical (MEMs) technology. A LIS3LV02DQ sensor is a 3-Axis-±2 g/±6 g digital output low voltage linear accelerometer.

Honeywell Inc. produces piezoelectric accelerometers such as SENSOTEC Model MA21 miniature, low profile amplified piezoelectric accelerometers. These devices are designed to be used in Industrial test and automation environments; including laboratory testing, modal studies and test cells where head room is limited and where a low profile unit is desirable. The constant current low output impedance output combined with the ability to drive high load capacitance allows long runs of low cost cable without degradation of data. The Model MA21 features a high natural frequency, a wide frequency range and a flat sensitivity vs. temperature response over the temperature range. The seismic element is mechanically isolated from the mounting base, resulting in a low base strain sensitivity. The stainless steel materials are non-magnetic, resulting in very low magnetic field susceptibility. These features, together with a sealed body, assure accurate and reliable data. This is a high frequency acceleration detector with a dynamic range of ±80 g.

Honeywell Q-flex® QA650 accelerometer can detect ±30 g and is an etched quartz flexure system with an analog output. It is typically used in automotive applications. Honeywell SIMMA SA500 accelerometer is a micro machined silicon accelerometer with two silicon beams vibrating at different frequencies; and their frequency difference is used to determine the g-value. Such an accelerometer is capable of detecting ±80 g and produces a digital wave output, whose frequency depends on the g-value. This Honeywell accelerometer is typically used in aerospace applications.

While, many of the accelerator sensors may be suitably designed for the high visibility safety lighting device, some sensors are more suited than others for the high visibility safety lighting device application. Only one of the three accelerometer axis needs to be used, with the in-use axis pointing along the vehicle, scooter, bicycle, wheel chair, baby carriage, or stroller travel direction.

The preferred acceleration sensor is a capacitive micromachined sensor that responds to accelerations perpendicular to the thickness direction of the sensor device. This sensor device is most useful for a vehicle handlebar mounted high visibility safety lighting device since the sensor is has its sensitive axis along the travel direction. A three axis accelerometer is more suited for a stroller, baby carriage or wheel chair device, wherein the cylindrical mounting surface does not enable a planar accelerometer to have its sensitive axis along the device's travel direction.

The single axis accelerometer analog output device is smaller than a penny. It outputs 0-5 volts based on the acceleration of the sensor in a helmet in its direction of travel. This output represents acceleration in the range of −5 g to +5 g. See, for example, Model 1220 or Model 1221 analog accelerometer from Silicon Designs Inc., 1445 Mall Street, Issaquah, Wash. 98027 web address www.silicondesigns.com. When there is no acceleration, the voltage output is 2.5 volts. Thus a voltage less than 2.5 volts represents deceleration while any voltage output greater than 2.5 volts represents acceleration. When the output is zero volts, the deceleration is −5 g and the output voltage in the range of 0 to 2.5 volts correlates linearly according to deceleration in the range of −5 g to 0 g. This is a hermetically sealed nitrogen damped capacitive micro machined sensor operating at an input voltage of 5 volts DC with a typical input current of 7 milliamps, thus consuming very little supply power. With this arrangement, the acceleration sensitive axis is perpendicular to the package and is mounted on a vertical surface of the C shaped claming surface of the high visibility safety lighting device.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A high visibility safety lighting system integrated within an external frame of a vehicle, comprising:
    a. at least one illumination segment incorporated within said frame, said frame comprising a handlebar assembly and a body assembly;
    b. at least one light source located within said illumination segment;
    c. a power supply means activated by a power control for supplying current to said light source and activating same to emit light; and
    d. said light source comprising a plurality of light emitting diodes integrated within a plurality of apertures located within each of said illumination segments of said frame to form a diode illumination segment;

whereby said light source emits light from said illumination segment of said frame of said vehicle so that said frame of said vehicle is highly visible alerting all proximate drivers and traffic to the presence of said vehicle and increasing safety accorded to an operator of said vehicle.

2. A high visibility safety lighting system as recited by claim 1, wherein said vehicle is a motorcycle, scooter, or other motor driven cycle-like device.

3. A high visibility safety lighting system as recited by claim 1, wherein said vehicle is a stroller, walker, or child's toy.

4. A high visibility safety lighting system as recited by claim 1, wherein said vehicle is a bicycle for an adult or child.

5. A high visibility safety lighting system as recited by claim 1, wherein at least one of said illumination segments is integrated within said handlebar assembly of said frame.

6. A high visibility safety lighting system as recited by claim 5, wherein said body assembly of said frame comprises a rear shaft assembly, support body, seat shaft, and front wheel shaft, and wherein at least one of said illumination segments is integrated within said rear shaft assembly, support body, seat shaft, and/or front wheel shaft assembly of said body assembly of said frame.

7. A high visibility safety lighting system as recited by claim 1, wherein said handlebar assembly includes at least one of said diode illumination segments.

8. A high visibility safety lighting system as recited by claim 7 comprising streamers extending from a pair of handlebar grips of said handlebar assembly, wherein said streamers include an electroluminescent wire integral therewith so that light is further emitted form said streamers.

9. A high visibility safety lighting system as recited by claim 7 comprising streamers extending from a pair of handlebar grips of said handlebar assembly, wherein said streamers include a plurality of fiber optic cables and a light source is associated with said fiber optic cable streamers so that said streamers emit light through said fiber optic cables.

10. A high visibility safety lighting system as recited by claim 7, wherein at least one of said diode illumination segments is integrated within a portion of said body assembly of said frame.

11. A high visibility safety lighting system as recited by claim 1, wherein said light emitting diodes of said diode illumination segments are sequenced intermittently to generate moving, blinking, flashing or cascading light.

12. A high visibility safety lighting system as recited by claim 1, wherein at least one illumination segment is transparent and comprises an inlay cavity therein to form a transparent illumination segment, and wherein said light source comprises an electroluminescent wire or strip that is housed within said inlay cavity of said transparent illumination segment.

13. A high visibility safety lighting system as recited by claim 12 further comprising at least one said diode illumination segment.

14. A high visibility safety lighting system as recited by claim 1, wherein said body assembly and said handlebar assembly of said frame are substantially composed of a transparent material constructed with an inlay channel appointed for housing said light source, wherein said light source comprises an electroluminescent light strip, and said inlay channel and said electroluminescent light strip extends within said frame so that a substantial portion of said frame emits light, thereby forming a lighted outline of said frame in dimly lit surroundings.

15. A high visibility safety lighting system as recited by claim 1, wherein said power supply means comprises one or more on-board batteries.

16. A high visibility safety lighting system as recited by claim 1, wherein said power control attached to said power supply means is activated by a pressure sensor located within an interior/seat of said vehicle for supplying current to said light source.

17. A high visibility safety lighting system as recited by claim 1 comprising a light sensor engaged with said power control attached to said power supply means for automatically activating/deactivating said current supply to said light source.

18. A high visibility safety lighting system as recited by claim 1 comprising one or more acceleration detecting means, a delay generating circuit means, and a microprocessor powered by said power supply for receiving acceleration information from said acceleration detecting means and delay time period information from said delay generating circuit means, said microprocessor turning on said light source located on said external illumination segment of said frame and keeping them turned on for a time period equal to the delay time, whereby any movement or change in velocity of said vehicle causes said light source to be actuated to an "on" condition and remain in the "on" condition for said delay time period even when said vehicle is stationary.

19. A high visibility safety lighting system integrated within an external frame of a vehicle, comprising:
   a. at least one illumination segment incorporated within said frame, said frame comprising a handlebar assembly and a body assembly;
   b. at least one light source located within said illumination segment;
   c. a power supply means activated by a power control for supplying current to said light source and activating same to emit light; and
   d. streamers extending from a pair of handlebar grips located in said handlebar assembly, wherein said streamers include an electroluminescent wire integral therewith so that light is further emitted form said streamers;
whereby said light source emits light from said illumination segment of said frame of said vehicle so that said frame of said vehicle is highly visible alerting all proximate drivers and traffic to the presence of said vehicle and increasing safety accorded to an operator of said vehicle.

20. A high visibility safety lighting system as recited by claim 19, wherein said light source comprises a plurality of light emitting diodes integrated within a plurality of apertures located within each of said illumination segments of said frame to form a diode illumination segment.

21. A high visibility safety lighting system integrated within an external frame of a vehicle, comprising:
   a. at least one illumination segment incorporated within said frame, said frame comprising a handlebar assembly and a body assembly;
   b. at least one light source located within said illumination segment;
   c. a power supply means activated by a power control for supplying current to said light source and activating same to emit light; and
   d. streamers extending from a pair of handlebar grips located in said handlebar assembly, wherein said streamers include a plurality of fiber optic cables and a light source is associated with said fiber optic cable streamers so that said streamers emit light through said fiber optic cables;
whereby said light source emits light from said illumination segment of said frame of said vehicle so that said frame of said vehicle is highly visible alerting all proximate drivers and traffic to the presence of said vehicle and increasing safety accorded to an operator of said vehicle.

22. A high visibility safety lighting system as recited by claim 21, wherein said light source comprises a plurality of light emitting diodes integrated within a plurality of apertures located within each of said illumination segments of said frame to form a diode illumination segment.

23. A high visibility safety lighting system integrated within an external frame of a vehicle, comprising:
   a. at least one illumination segment incorporated within said frame, said frame comprising a handlebar assembly and a body assembly;
   b. at least one light source located within said illumination segment;
   c. a power supply means activated by a power control for supplying current to said light source and activating same to emit light; and
   d. said power control attached to said power supply means includes a card reader, and a key is provided including a card tag that activates said card reader, which in turn activates said power control for supplying current to said light source;
whereby said light source emits light from said illumination segment of said frame of said vehicle so that said frame of said vehicle is highly visible alerting all proximate drivers and traffic to the presence of said vehicle and increasing safety accorded to an operator of said vehicle.

24. A high visibility safety lighting system as recited by claim 23, wherein said light source comprises a plurality of light emitting diodes integrated within a plurality of apertures located within each of said illumination segments of said frame to form a diode illumination segment.

* * * * *